June 13, 1961 F. PETERS 2,988,585
HERMETICALLY SEALED ALKALINE STORAGE BATTERY
Filed March 21, 1958
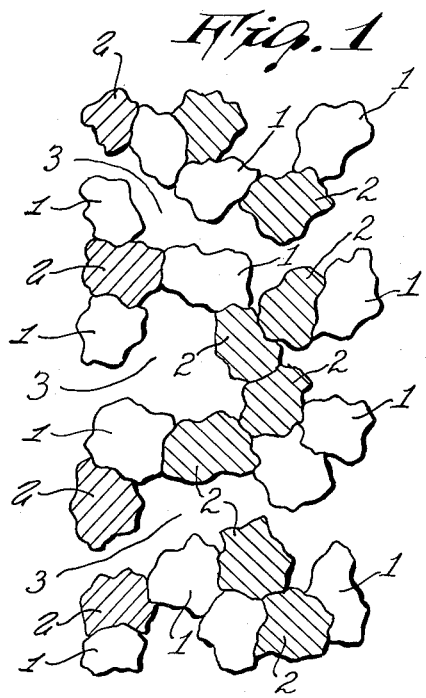
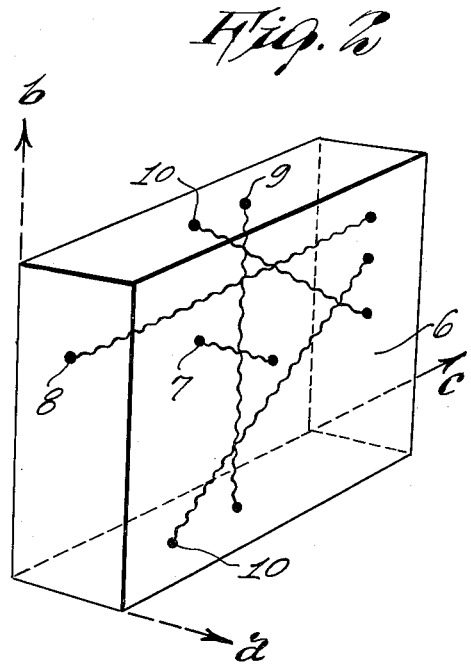
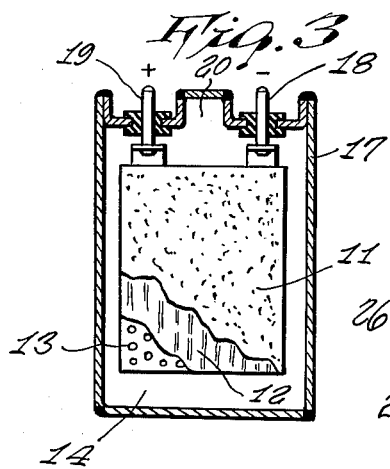
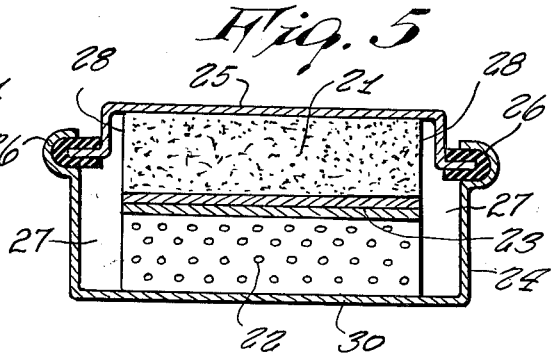
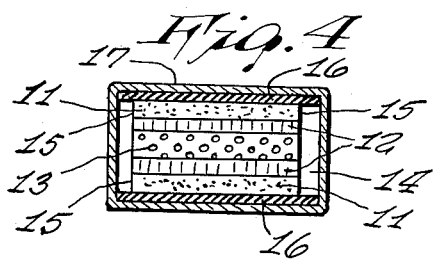
INVENTOR.
FREIMUT PETERS
BY Mestern & Kollin
ATTORNEYS

2,988,585
HERMETICALLY SEALED ALKALINE STORAGE BATTERY

Freimut Peters, Hagen, Westphalia, Germany, assignor to Accumulatoren-Fabrik Aktiengesellschaft, Frankfurt am Main, Germany
Filed Mar. 21, 1958, Ser. No. 722,986
Claims priority, application Germany June 23, 1952
10 Claims. (Cl. 136—24)

The present invention relates to an alkaline storage battery of the hermetically sealed type. This application is a continuation-in-part application of my co-pending application Ser. No. 362,942, filed June 19, 1953, now abandoned.

The electrodes used in storage batteries of this type are compressed electrodes. In accordance with the present invention, it is intended to use also compressed electrodes for reasons set forth below. These electrodes are partly composed of active mass and partly of an electrochemically inactive metal powder, all of which will be more fully described in the following specification.

When compressed electrodes with addition of nickel powder are to be used in hermetically sealed storage batteries, special measures have to be provided for making the consumption of gas, especially oxygen, most complete. The addition of nickel powder serves the purpose of establishing contact between large metallic, electrochemically inactive surfaces having the potential of the negative electrode, and the gas space.

According to known methods, gas consumption was accomplished by the use of the active mass proper. This was made possible e.g. by providing spaces for gas collection in separators arranged between electrodes of opposite polarity; oxygen evolved at the negative electrode was collected in said spaces, passed through these to the negative electrode, and oxidized the active mass of the same. This arrangement has certain inconveniences. By the gas bubbles, the passage of the current is interrupted and the active mass is, in certain places, covered with oxide layers of considerable thickness, which will prevent the active mass from being utilized electrochemically to full extent.

It has been found that improved oxygen consumption can be achieved by the use of large metal surfaces, more particularly consisting of sintered nickel, as they have been proposed in my co-pending U.S. patent application Ser. No. 344,210, filed March 23, 1953, now U.S. Patent No. 2,798,110. However, further investigation has shown that compressed negative electrodes, which are much easier to manufacture, can likewise be used in hermetically sealed storage batteries, when the electrolyte is immobilized by capillary action in the pores of the electrodes and of separators therebetween, and when, as a further measure, the compressed electrodes are made to contain an electrochemically inactive metal powder having a large surface in addition to active cadmium mass, wherein the metal powder forms the necessary metallic contact surfaces with the gas space and serves for oxygen consumption.

Since care will be taken to mix the metal powder evenly with the active mass, the proportion of powder at the surface will correspond to its amount in the compressed electrode. Thus, when the mixture contains 50% by volume of active cadmium mass and 50% by volume of metal powder, the surface of the compressed electrode will likewise contain a ratio of 50:50 of the two components.

Therefore, half of the surface which is covered by metal powder, will serve for gas consumption, provided that parts of the surface of the negative electrode are in contact with the gas space and are covered only with a thin electrolyte film.

The nickel powder, which forms the gas-consuming contact faces, should have a special structure; compact powder is not satisfactory. I have found nickel powder to be particularly suitable when made by decomposition of nickel carbonyl vapor and having a bulk weight of 0.4 to 1 gram per cc., and preferably having in more than 80 percent by weight a grain size of a diameter below 0.006 mm.

This is a finely subdivided nickel powder of more or less globular primary parts having a diameter of 1–5µ or less, if desired; larger diameters should be avoided. The primary particles form larger secondary aggregates in sponge form or other porous structures, whereby a large metallic surface will be formed.

Another very satisfactory nickel powder is obtained by the reduction of nickel compounds, e.g. nickel hydroxide in a current of hydrogen at low temperatures, for instance 300–400° C.

Mechanically comminuted nickel, for instance, a powder obtained by grinding larger nickel particles, may likewise be used, when it is sufficiently fine, i.e. has a particle size of $d>5\mu$ and a bulk weight preferably below 1 gram/cc.

By stating the bulk weight above it is not intended to set a definite limit. Of course, it is possible to use nickel powder having a higher bulk weight; however, an electrode will then be obtained which has too large an amount by weight of nickel and too small an amount of cadmium and which has, therefore, the drawback of too low capacity. More important than the bulk weight, however, is the grain size. The reason for this is that with the degree of fineness, the surface of the nickel powder increases, which may be computed as follows for cube-shaped particles:

$$O_{spec} = \frac{6}{d}$$

In this formula, $O_{spec.}$ stands for the surface of 1 cc. of powder, $d$ for the diameter of the cube-shaped particles or length of one edge. Example: A cube having an edge length=1 cm., has a spec. surface of 6 sq. cms. when this cube is divided into cubes of the edge length=1µ, the $O_{spec.}=6.10^4$ sq. cms. Similar considerations apply for globular particles.

These considerations show the importance of providing a large metallic contact surface in the form of nickel powder by finest subdivision of the particles. This state is ascertained when more than 80% of the nickel powder has a grain size with $d<0.006$ mm.

As already mentioned, a further increase of the contact of the nickel powder surface with the gas space is enhanced by the formation of secondary aggregates in sponge shape or the like from primary particles.

Another important feature to be observed is the porosity to be imparted to the entire electrode, which likewise makes for a large metallic contact surface. As explained above, 50% of the electrode will be formed of nickel powder, when the same is composed of 50% by volume of nickel powder and 50% by volume of active mass. In these figures the pores are not considered; they apply to the surface without pores.

I found it to be advantageous to make the porosity of the electrode not larger than 60% and not smaller than 30%. Then, in the first case, there remain 40% of the surface formed by active mass plus nickel powder, in the second case 70% formed by the said substances, the nickel powder taking up half of the surface in each case. When the porosity is larger than 60%, the metallic surface is too small, the electrode itself is too loose, has too little cohesion and will, therefore, be easily destroyed, thus its useful life will be too short.

When the porous surface, corresponding to the porosity of the electrode, is about 30%, the metallic portion of the surface in the form of nickel powder is 35%, the active mass likewise 35%. This means that the gas-consuming portion is increased as compared to 20% nickel powder, in case of 60% porosity (with the latter porosity, there will be 20% each of Ni powder and of active mass), but the electrode will have so narrow pores that the amount of electrolyte absorbed therein will be insufficient and the active mass will not be sufficiently utilized. Such strongly compressed electrodes have, therefore, an insufficient capacity.

This proves that the indicated limit values are critical, as are the grain size and the grain structure of the Ni powder.

The upper limit for the ratio of cadmium mass:nickel powder is 1:1 parts by volume. This is a critical value, since with more Ni powder present, the cadmium mass would not be capable of reinforcing the Ni powder to form a porous body. In parts by weight, this amounts to 100 grams cadmium hydroxide per 185 grams nickel powder. The lower limit for nickel powder is about 4 parts by volume cadimum mass:1 part by volume nickel powder.

In order to enhance gas consumption, it is possible to enrich the surface of the negative compressed electrode facing the gas space, in the amount of nickel powder. This can be done, for instance, by sprinkling nickel powder on the finished compressed electrode and to unite this added nickel powder with the electrode by a second compression. Another method consists in first pouring a layer of nickel powder into the compression mold serving for making the compressed electrodes., and thereon pouring the mixture of nickel powder plus active mass. The powder in the mold is then compressed to form the compressed electrode, the pressure applied being from 700 to 1500 kg./sq. cm. These pressures, which also apply to compressed electrodes, which have not been specially prepared on one surface, are critical for the electrodes according to the present invention. Higher pressures result in too compact electrodes with low capacity, lower pressures in loose electrodes of short life. The surface carrying the nickel powder layer faces the gas space in the assembled storage battery.

A third method for making electrodes having a higher content in nickel powder at the surface of the compressed electrode facing the gas space, is a treatment of the surface with chemical agents which dissolve the cadmium mass, e.g. a mixture of ammonia and hydrogen peroxide, or a solution of ammonium persulfate agents that is which do not attack the nickel. After the treatment with the chemicals, the electrodes have to be washed free of the said agents and dried.

Instead of nickel powder, other finely subdivided metal powders may be used e.g. copper-nickel powder, iron powder, or nickel-iron powder, cobalt powder, in some cases also copper powder.

The compressed electrode according to the invention will now be described with reference to the accompanying drawing, but it should be understood that this embodiment is shown by way of illustration and not of limitation and that many changes in the details can be made without departing from the spirit of the invention.

In the drawing:

FIG. 1 shows diagrammatically on an enlarged scale the structure of section of a compressed electrode according to the invention;

FIG. 2 is a perspective showing of an electrode in an $a, b, c$ coordinate system, illustrating some individual pores;

FIG. 3 illustrates, partly in longitudinal section, an electrode according to the invention, FIG. 4 is a transverse section of the same electrode, and FIG. 5 is a section of modified embodiment.

Referring now to FIG. 1, this illustrates an embodiment of the electrode, in which nickel powder and active cadmium mass are contained in a ratio of 1 part by volume of Ni:1 part by volume of Cd. The mass shown is obtained by compressing in a mold by means of a plunger to a body of 60% porosity. The particles of active mass at the surface and in the interior of the electrode are designated by reference numeral 1, the nickel particles at the surface and in the interior of the electrode are designated by reference numeral 2, and the pores between the powder particles are designated by reference numeral 3. The figure illustrates the fact that the outer surface of the electrode consists of three different structural elements: particles of mass 1, particles of nickel 2, and pores 3.

In the perspective showing of FIG. 2, each electrode has two faces $a$—$b$, two faces $a$—$c$, and two faces $b$—$c$. In the electrode, the pores are distributed about evenly in all directions and are intersecting Pores passing in different directions through the electrode are shown, such as a pore 7 traversing the electrode from one face $b$—$c$ to the other face $b$—$c$, pore 8 from one $a$—$b$ face to the other $a$—$b$ face, and pore 9 passing from one $a$—$c$ face to the other $a$—$c$ face. Pores 10 run obliquely through the electrode body, from one $a$—$c$ face to an $a$—$b$ face. Of course, the pores may run in other directions as well.

In FIGS. 3 and 4, a cell of the storage battery is shown to comprise two negative compressed electrodes 11, and one positive electrode 13, with interposed, absorbent separators 12 having fine pores. The set of plates is enclosed in a hermetically sealed casing 17. The negative electrodes are provided with lead-in 18 and the positive electrode with a lead-in 19, which are insulatingly passed through casing 17. An opening 20 serves for filling in the electrolyte; after formation of the battery, the freely movable electrolyte is removed through said opening. The opening can likewise be hermetically sealed. By removal of the freely movable electrolyte, gas spaces 14 will form, which are in contact with the electrodes. The areas indicated by 15 are in contact with the surfaces of the negative electrode. These areas are the ones where gas consumption will take place. In the embodiment illustrated, the negative electrodes are insulated from the metallic casing 17 by insulating means 16.

In FIGS. 3 and 4, an embodiment of a storage battery is illustrated in which insulated lead-ins through the casing to the electrodes are provided. In another embodiment, such individual lead-ins are dispensed with and the current is made to pass through parts of the casing instead. This is shown in FIG. 5.

As illustrated in that figure, inside the casing a negative electrode 21 and a positive electrode 22 are arranged, which are separated by an electrolyte-filled separator 23 having fine pores. The pair of electrodes is enclosed in a two-part casing 30, having a cup-shaped upper portion 25 and a cup-shaped lower portion 24 separated from one another by an insulating ring 26. Hermetical sealing is brought about by crimping the edges of the lower cup 24 over the insulating ring 26.

Enclosed in the casing is a gas space 27 and the negative electrode contacts this space over large areas 28. In these areas, nickel powder, or another electrochemically inactive metal, mixed to the mass of the negative electrode, takes up a large surface space.

It should be understood that the storage battery according to the invention may be made in other designs. For instance, the casing may be made in pencil-like shape, with the electrodes concentrically arranged therein. In such a case, a rod-shaped positive electrode is centrally arranged in the casing with a cylindrical negative electrode enclosing the positive electrode.

As positive electrodes of the storage batteries according to the invention may be used any known type, suitable for alkaline accumulators, for instance electrodes of the sintered, pressed, folded strip, tubular or pocket type, carrying an active mass normally used for this purpose, for instance nickel-hydroxide mass.

What I claim is:

1. In a hermetically sealed alkaline storage battery, in combination, a container means adapted to be hermetically sealed; an electrode assembly located in said container means and including at least one porous positive electrode, at least one compressed porous negative electrode, a porous separator located between adjacent positive and negative electrodes, an alkaline electrolyte located in the pores of said porous separator and of said electrodes, said electrode assembly filling said container means but partly so as to define in the interior of said container means a gas space bounded partly by surface portions of said negative electrode, said negative electrode being formed of a compressed intimate mixture consisting essentially of active negative cadmium mass and of a metal powder substantially having a particle size of between about 1 and 5µ, said metal powder being selected from the group consisting of nickel powder, copper-nickel powder, copper powder, cobalt powder, nickel-iron powder and iron powder, and comprising between 20 and 50% by volume of the total volume of the solid constituents of said negative electrode, and the pore volume of said compressed negative electrode being equal to approximately between 30 and 60% of the total volume of the same, whereby oxygen formed during operation of said sealed battery will collect in said gas space and will come in contact with portions of said negative electrode facing said gas space, to be consumed in contact with said metal forming part of said compressed porous negative electrode.

2. In a hermetically sealed alkaline storage battery, in combination, a container means adapted to be hermetically sealed; an electrode assembly located in said container means and including at least one porous positive electrode, at least one compressed porous negative electrode, a porous separator located between adjacent positive and negative electrodes, an alkaline electrolyte located in the pores of said porous separator and of said electrodes, said electrode assembly filling said container means but partly so as to define in the interior of said container means a gas space bounded partly by surface portions of said negative electrode, said negative electrode being formed of a compressed intimate mixture consisting essentially of active negative cadmium mass and of nickel powder substantially having a particle size of between about 1 and 5µ and comprising between 20 and 50% by volume of the total volume of the solid constituents of said negative electrode, and the pore volume of said compressed negative electrode being equal to approximately between 30 and 60% of the total volume of the same, whereby oxygen formed during operation of said sealed battery will collect in said gas space and will come in contact with portions of said negative electrode facing said gas space, to be consumed in contact with said nickel forming part of said compressed porous negative electrode.

3. In a hermetically sealed alkaline storage battery, in combination, a container means adapted to be hermetically sealed; an electrode assembly located in said container means and including at least one porous positive electrode, at least one compressed porous negative electrode, a porous separator located between adjacent positive and negative electrodes, an alkaline electrolyte located in the pores of said porous separator and of said electrodes, said electrode assembly filling said container means but partly so as to define in the interior of said container means a gas space bounded partly by surface portions of said negative electrode, said negative electrode being formed of a compressed intimate mixture consisting essentially of active negative cadmium mass and of a copper-nickel powder substantially having a particle size of between about 1 and 5µ and comprising between 20 and 50% by volume of the total volume of the solid constituents of said negative electrode, and the pore volume of said compressed negative electrode being equal to approximately between 30 and 60% of the total volume of the same, whereby oxygen formed during operation of said sealed battery will collect in said gas space and will come in contact with portions of said negative electrode facing said gas space, to be consumed in contact with said copper-nickel forming part of said compressed porous negative electrode.

4. In a hermetically sealed alkaline storage battery, in combination, a container means adapted to be hermetically sealed; an electrode assembly located in said container means and including at least one porous positive electrode, at least one compressed porous negative electrode, a porous separator located between adjacent positive and negative electrodes, an alkaline electrolyte located in the pores of said porous separator and of said electrodes, said electrode assembly filling said container means but partly so as to define in the interior of said container means a gas space bounded partly by surface portions of said negative electrode, said negative electrode being formed of a compressed intimate mixture consisting essentially of active negative cadmium mass and of copper powder substantially having a particle size of between about 1 and 5µ and comprising between 20 and 50% by volume of the total volume of the solid constituents of said negative electrode, and the pore volume of said compressed negative electrode being equal to approximately between 30 and 60% of the total volume of the same, whereby oxygen formed during operation of said sealed battery will collect in said gas space and will come in contact with portions of said negative electrode facing said gas space, to be consumed in contact with said copper forming part of said compressed porous negative electrode.

5. In a hermetically sealed alkaline storage battery, in combination, a container means adapted to be hermetically sealed; an electrode assembly located in said container means and including at least one porous positive electrode, at least one compressed porous negative electrode, a porous separator located between adjacent positive and negative electrodes, an alkaline electrolyte located in the pores of said porous separator and of said electrodes, said electrode assembly filling said container means but partly so as to define in the interior of said container means a gas space bounded partly by surface portions of said negative electrode, said negative electrode being formed of a compressed intimate mixture consisting essentially of active negative cadmium mass and of nickel-iron powder substantially having a particle size of between about 1 and 5µ and comprising between 20 and 50% by volume of the total volume of the solid constituents of said negative electrode, and the pore volume of said compressed negative electrode being equal to approximately between 30 and 60% of the total volume of the same, whereby oxygen formed during operation of said sealed battery will collect in said gas space and will come in contact with portions of said negative electrode facing said gas space, to be consumed in contact with said nickel-iron forming part of said compressed porous negative electrode.

6. In a hermetically sealed alkaline storage battery, in combination, a container means adapted to be hermetically sealed; an electrode assembly located in said container means and including at least one porous positive electrode, at least one compressed porous negative electrode, a porous separator located between adjacent positive and negative electrodes, an alkaline electrolyte located in the pores of said porous separator and of said electrodes, said electrode assembly filling said container means but partly so as to define in the interior of said container means a gas space bounded partly by surface portions of said negative electrode, said negative electrode being formed of a compressed intimate mixture consisting essentially of active negative cadmium mass and of a cobalt powder substantially having a particle size of between about 1 and $5\mu$ and comprising between 20 and 50% by volume of the total volume of the solid constituents of said negative electrode, and the pore volume of said compressed negative electrode being equal to approximately between 30 and 60% of the total volume of the same, whereby oxygen formed during operation of said sealed battery will collect in said gas space and will come in contact with portions of said negative electrode facing said gas space, to be consumed in contact with said cobalt forming part of said compressed porous negative electrode.

7. In a hermetically sealed alkaline storage battery, in combination, a container means adapted to be hermetically sealed; an electrode assembly located in said container means and including at least one porous positive electrode, at least one compressed porous negative electrode, a porous separator located between adjacent positive and negative electrodes, an alkaline electrolyte located in the pores of said porous separator and of said electrodes, said electrode assembly filling said container means but partly so as to define in the interior of said container means a gas space bounded partly by surface portions of said negative electrode, said negative electrode being formed of a compressed intimate mixture consisting essentially of active negative cadmium mass and of iron powder substantially having a particle size of between about 1 and $5\mu$ and comprising between 20 and 50% by volume of the total volume of the solid constituents of said negative electrode, and the pore volume of said compressed negative electrode being equal to approximately between 30 and 60% of the total volume of the same, whereby oxygen formed during operation of said sealed battery will collect in said gas space and will come in contact with portions of said negative electrode facing said gas space, to be consumed in contact with said iron forming part of said compressed porous negative electrode.

8. In a hermetically sealed alkaline storage battery, in combination, a container means adapted to be hermetically sealed; an electrode assembly located in said container means and including at least one porous positive electrode, at least one compressed porous negative electrode, a porous separator located between adjacent positive and negative electrodes, an alkaline electrolyte located in the pores of said porous separator and of said electrodes, said electrode assembly filling said container means but partly so as to define in the interior of said container means a gas space bounded partly by surface portions of said negative electrode, said negative electrode comprising a main portion being formed of a compressed intimate mixture consisting essentially of active negative cadmium mass and of a metal powder selected from the group consisting of nickel powder, copper-nickel powder, copper powder, cobalt powder, nickel-iron powder and iron powder, and substantially having a particle size of between about 1 and $5\mu$, said metal powder being capable of consuming gaseous oxygen formed during operation of said battery while being otherwise electrochemically inactive in contact with said alkaline electrolyte, said metal powder comprising between 20 and 50% by volume of the total volume of the solid constituents of said main portion of said negative electrode, and a surface portion facing said gas space and containing a larger percentage amount of said metal than said main portion, the pore volume of said compressed negative electrode being equal to approximately between 30 and 60% of the total volume of the same, whereby oxygen formed during operation of said sealed battery will collect in said gas space and will come in contact with portions of said negative electrode facing said gas space, to be consumed in contact with said metal forming part of said compressed porous negative electrode.

9. A method of making a compressed negative electrode for use in a hermetically sealed alkaline storage battery, comprising the steps of forming an intimate mixture of active negative cadmium mass and of a metal powder, the major portion of which has a particle size of between 1 and $5\mu$, said metal powder being selected from the group consisting of nickel powder, copper-nickel powder, copper powder, cobalt powder, nickel-iron powder and iron powder, said metal powder comprising between 20 and 50% per volume of said intimate mixture; compressing said mixture at a pressure ranging between 700 and 1500 kilograms per square centimeter so as to form a porous self-supporting compressed electrode having a pore volume equal to between 30 and 60% of the total volume of said electrode; and increasing the relative amount of said metal in at least part of the surface portion of said porous electrode.

10. A method of making a compressed negative electrode for use in a hermetically sealed alkaline storage battery, comprising the steps of forming an intimate mixture of active negative cadmium mass and of a metal powder, the major portion of which has a particle size of between 1 and $5\mu$, said metal powder being selected from the group consisting of nickel powder, copper-nickel powder, copper powder, cobalt powder, nickel-iron powder and iron powder, said metal powder comprising between 20 and 50% per volume of said intimate mixture; covering at least part of said mixture with a layer consisting of said metal powder; and compressing the thus covered mixture at a pressure ranging between 700 and 1500 kilograms per square centimeter so as to form a porous self-supporting compressed electrode having a pore volume equal to between 30 and 60% of the total volume of said electrode and a higher concentration of said metal in at least part of its outer portion.

References Cited in the file of this patent

UNITED STATES PATENTS

| | | |
|---|---|---|
| 2,571,927 | Neumann et al. | Oct. 16, 1951 |
| 2,646,457 | Jacquier | July 21, 1953 |
| 2,699,458 | Schlecht | Jan. 11, 1955 |
| 2,798,110 | Peters | July 2, 1957 |
| 2,830,108 | Peters | Apr. 29, 1958 |
| 2,832,813 | Peters | Apr. 29, 1958 |

FOREIGN PATENTS

| | | |
|---|---|---|
| 608,896 | Great Britain | Sept. 22, 1948 |
| 751,725 | Great Britain | July 4, 1956 |
| 755,547 | Great Britain | Aug. 22, 1956 |
| 765,073 | Great Britain | Jan. 2, 1957 |